Patented Apr. 8, 1952

2,592,349

UNITED STATES PATENT OFFICE 2,592,349

PROCESS FOR PREPARING AND REDUCING MONONITRATED POLYSTYRENE

Anders Skogseid, Oslo, Norway, assignor to Norsk Hydro-Elektrisk Kvaelstofaktieselskab, Oslo, Norway No Drawing. Application July 23, 1947, Serial No. 763,145. In Norway September 2, 1943

2 Claims. (Cl. 260—93.5)

It is known to produce high molecular weight polymeric cyclic amine compounds and to use these as anion exchangers. As a basic substance for such anion exchangers one can regard the condensation products of anilines and aldehydes. (R. Griessbach, Beihefte 31, Angew. Chemie 52 (1939), 215.)

According to the present invention new artificial substances with essentially different properties from those mentioned above are provided as bases for anion exchangers, and as by the introduction of new groups one can, from these high molecular weight polymeric amine compounds, produce high molecular weight polymeric acid compounds which are cation exchangers, then these substances will be the basis for new anion as well as for cation exchangers.

Nitro and amino-styrenes are known, and by polymerisation of these, poly-nitro-styrenes and poly-amino-styrenes, respectively, are obtained. But the production of mono-molecular nitro and amino-styrenes must take place by roundabout methods, and with such a low yield that the methods are unsuited for technical preparations.

We have now found that high molecular weight polymeric nitro-styrenes can be produced with theoretical yield by nitrating high molecular weight polymeric styrenes in suitably concentrated nitric acid, preferably whilst being cooled. Poly-styrene is dissolved easily in concentrated nitric acid (specific gravity over 1.46) during nitration, and, by diluting the solution with water, the nitrated poly-styrene is precipitated.

By reducing the poly-nitro-styrenes thus produced, for instance, with a reducing sulphur compound, especially sodium-disulphide, poly-aminostyrenes are obtained. If the reduction of the nitro compound takes place with sodium-sulphide in aqueous solution by boiling (approx. 100° C.), then the reduction is slow, and only a comparatively small portion of the nitro compound will be reduced. One gets a better reduction if the process takes place in alcoholic solution by boiling (approx. 80° C.). But, if these reductions take place in aqueous solution and at higher temperatures under pressure, for example, at 150° C., then the reduction is comparatively quick and complete. In the course of 8 hours we have thus reached a reduction of poly-nitro-styrene of about 75%.

Poly-vinyl-naphthalenes and other high molecular weight polymeric compounds can, in a corresponding way, be converted into their nitro and amino compounds.

Contrary to the previously known exchangers which can be regarded as condensation products of anilines with aldehydes, the substances which are produced according to the invention are thermoplastic. The plastic properties are, as will be understood, of importance for the production of ion exchangers suitable for technical purposes (the granulation process).

By the reduction described above from nitro to amino compounds, in order to obtain a good yield, it is of advantage to operate with a porous and finely ground substance. In order to obtain a technically suitable exchanger, the amino compound must therefore finally be subjected to briquetting, which, for the retention of the capillaries, can take place in the presence of, for instance, water, or salt, which can be dissolved afterwards.

Example 100 gr. poly-styrene (Tolitul III) of molecular weight 180,000–200,000 by ultracentrifuge is dissolved in 700 cc. 90 per cent by weight $HNO_3$ whilst being stirred and cooled below 10° C. Retained at this temperature for 17 hours. The solution is poured into a large volume of cold water. The separated macaroni-like mass is crushed and well washed free of $HNO_3$. A theoretical yield of mono-nitrated poly-styrene is achieved. With an equivalent quantity of $Na_2S_2$ dissolved in water, the nitro compounds are reduced in the autoclave at 150° C. in the course of 8 hours to amino compounds. N-content theoretically 11.75%, actual finding 11.2%. Capacity 6.2 meq./g.

By the capacity of the exchanger is understood the number of milli-equivalents of exchangeable anions which are bound to 1 gram of anion exchanger.

The method is not confined to the production of mono-amino compounds. One can thus with higher nitro compounds, for instance, di-nitro compounds, in a corresponding manner produce di-amino compounds, which have still greater capacity than mentioned in the preceding example.

I claim:

1. A process for the preparation of a high molecular weight polymeric amine ion exchange resin comprising nitrating high molecular weight polystyrene at a temperature below 10° C. with nitric acid of a concentration above 80% by weight, to introduce thereby one nitro group into each benzene ring of the high molecular weight polystyrene and thereafter reducing the mononitro high molecular weight polystyrene formed by reaction with an alkali sulphide reducing agent selected from the class consisting of sodium sulphide and sodium disulphide, said reducing agent dissolved in water and said reaction conducted at a temperature between about 100° C. and about 150° C. in an autoclave.

2. A process as in claim 1 wherein the reducing agent is sodium disulphide.

ANDERS SKOGSEID.

REFERENCES CITED

The following references are of record in the file of this patent:

UNITED STATES PATENTS

| Number | Name | Date |
|---|---|---|
| 1,074,545 | Flurschiem | Sept. 30, 1913 |
| 1,771,615 | Brincil | July 29, 1930 |
| 2,274,551 | Kenyon | Feb. 24, 1942 |
| 2,366,008 | D'Alelio | Dec. 26, 1944 |

OTHER REFERENCES

Norris: "Experimental Organic Chemistry," pages 146–149, McGraw-Hill (1933).